Nov. 12, 1968  E. G. CHEAK  3,410,549
VEHICLE SUSPENSION
Filed July 5, 1966  3 Sheets-Sheet 1

INVENTOR.
EDWARD G. CHEAK
BY
Lothrop & West
ATTORNEYS

INVENTOR.
EDWARD G. CHEAK
BY
Lothrop & West
ATTORNEYS

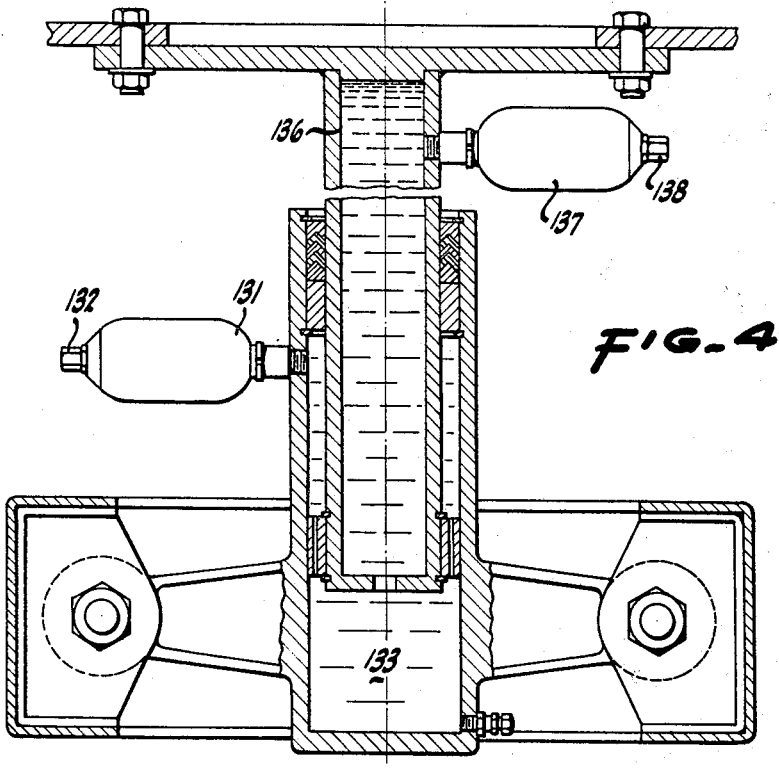
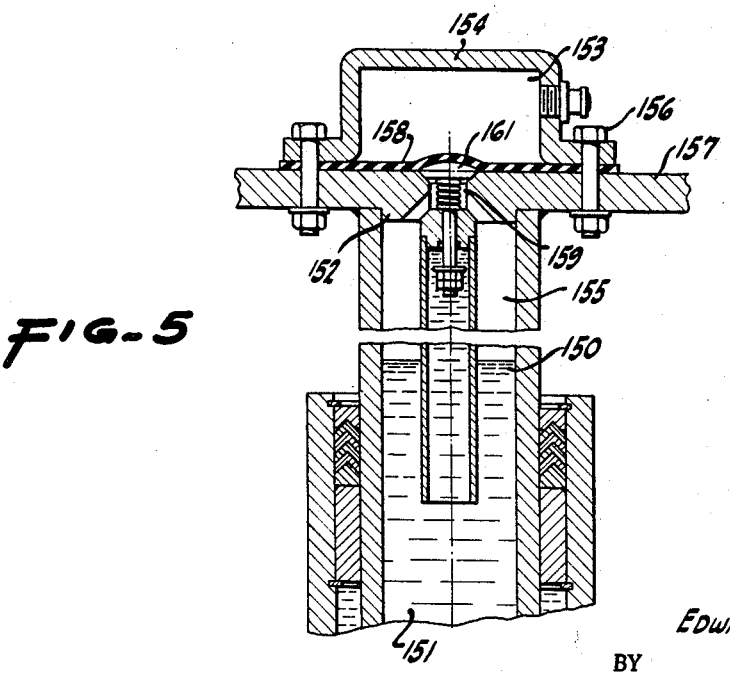

United States Patent Office 3,410,549
Patented Nov. 12, 1968

3,410,549
VEHICLE SUSPENSION
Edward G. Cheak, 36 Dean Way,
Chico, Calif. 95926
Filed July 5, 1966, Ser. No. 562,551
5 Claims. (Cl. 267—64)

ABSTRACT OF THE DISCLOSURE

A strut connecting the main frame of a motor vehicle with the running gear thereof includes a pair of vertical, telescoping, tubular members arranged for relative rotation and translation. The members are constructed so as to form a primary chamber containing a body of oil and air and a secondary chamber containing at least a body of air. Under conditions of light load the suspension provided by the hydro-pneumatic fluids in the primary chamber afford a good ride; under heavy loads the secondary chamber structure becomes operative, thereby also giving a satisfactory performance under conditions of heavy load.

My invention relates to means for interconnecting the main frame and body of a road vehicle with the running gear and wheels thereof. It is especially concerned with a vehicle suspension. The invention particularly is for use in vehicles such as trucks and trailers sometimes carrying relatively heavy loads and is especially concerned with such a suspension mechanism effective to give satisfactory performance both when the vehicle is unloaded and relatively light and when the vehicle is loaded and is relatively heavy.

At the present time most vehicle suspension systems for vehicles of this character are designed and constructed so as to operate well under the maximum loads that the vehicle is subjected to in service, having in mind the nature of the terrain, whether paved or unpaved, over which the vehicle must operate. Under many circumstances the vehicle must travel under entirely different conditions. For example, the vehicle may not be loaded at all. The heavy duty suspension gives poor results when the vehicle is light. The ride not only becomes unduly uncomfortable for the drive, but causes excessive bouncing, swaying and jostling of the vehicle, leading to large vibrational stresses and a rapid deterioration. If, on the contrary, a type of suspension is afforded which permits a relatively good ride when the vehicle is light, then there may be overload and overstrain of the suspension system under the usual operating conditions of loaded transport and poor vehicle performance.

It is therefore an object of the invention to provide a vehicle suspension which is effective both at light and heavy loads on the vehicle to afford an appropriate and satisfactory ride both for the driver and also for the lading.

Another object of the invention is to provide a vehicle suspension which will operate well in two load ranges without involving extra complication and without employing mechanism which is sensitive and difficult to maintain.

Another object of the invention is to provide a vehicle suspension of a nature which can, if desired, be utilized not only to support the load on the running gear, but likewise to permit steering or rotational movement of the vehicle.

Another object of the invention is to provide a vehicle suspension made up in most respects of relatively easily manufactured and maintained parts and which does not require any extraordinary amount of service or attention by people other than those normally available.

A further object of the invention is in general to provide an improved vehicle suspension.

Other objects together with the foregoing are attained in the embodiments of the invention described in the accompanying description and illustrated in accompanying drawings, in which:

FIGURE 4 is a view comparable to FIGURE 1 but showing a still further modified form of vehicle suspension pursuant to the invention; and FIGURE 5 is a view comparable to FIGURE 1 but showing an additional modified form of vehicle suspension pursuant to the invention.

Figure 1:
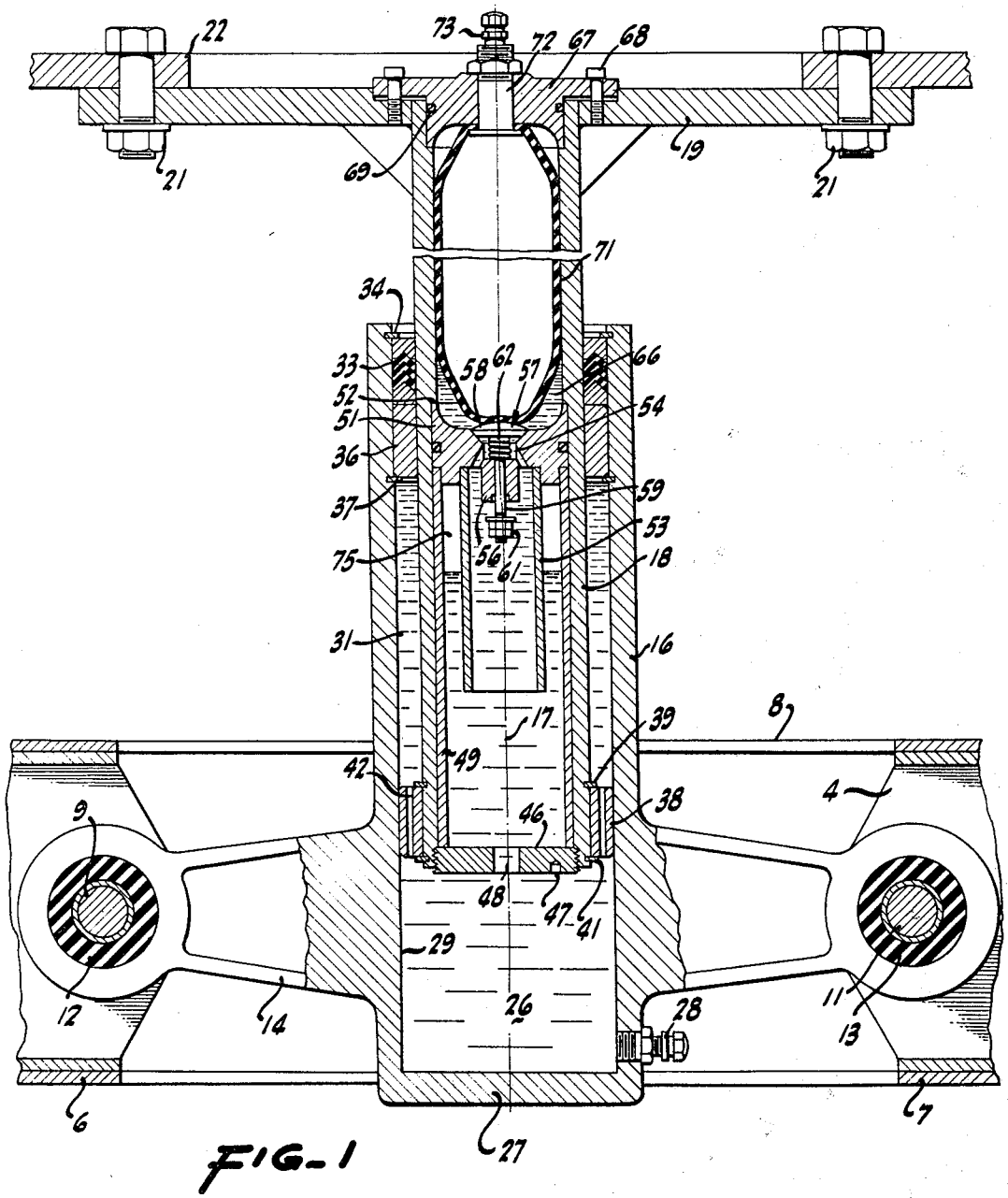
FIGURE 1 is a cross section on a vertical traverse plane through one form of vehicle suspension pursuant to the invention.

While the vehicle suspension can be readily incorporated in a number of different vehicles, it has for explanation been shown and is described herein as it is incorporated for use primarily in a vehicle such as a trailer designed to be towed by a power vehicle such as a tractor and is particularly for use in over-the-road transport with relatively heavy loads alternated with light loads.

Since the running gear of the trailer; that is, the ground-engaging wheels and axle, are standard, they are not illustrated herein, it being sufficient to understand that the axle mechanism is connected to a ground frame 4 comprising structural shapes spaced apart on either side of the longitudinal axis of the machine. The side members 6 and 7 are interconnected by an appropriate cross member 8 in the customary fashion. The side members include longitudinal support pins 9 and 11 carrying rubber bushings 12 and 13 seated in the opposite ends of a supporting cross beam 14. In this fashion the cross beam is not only connected to the running gear frame side members 6 and 7, but likewise may partake of some yielding motion to dampen or reduce wracking strains.

In accordance with the invention, the beam 14 is preferably integrally cast with an outer, circular cylindrical sleeve 16 symmetrical about a substantially vertical axis 17. Thus, as the running gear and the frame members 6 and 7 turn as the vehicle is steered, the outer sleeve 16 rotates about the axis 17.

Coaxial with the outer sleeve 16 is an inner sleeve 18 arranged in telescopic arrangement with the outer sleeve so that the two sleeves may not only rotate relative to each other about the axis 17, but may partake of relative translational movement along the axis 17 both up and down. The inner sleeve 18 extends upwardly and is joined to a cross plate 19 secured by fastenings 21 to the frame 22 of the taller. In this fashion the running gear and the trailer are pivoted with respect to each other and move toward and away from each other in a vertical direction.

Means are provided for containing a body 26 of fluid such as oil within the outer sleeve 16. To that end, the lower end of the sleeve is closed by a bottom wall 27. A fill and drainage plug 28 is provided near the bottom of the primary chamber 29 defined in part by the inner walls of the outer sleeve 16 and the bottom wall 27. The valve 28 when open can be utilized to drain the primary chamber 29 or to supply it with a suitable fluid. While oil is referred to as the usual fluid involved, it may be any appropriate liquid material which can substitute for the customarily available oil.

Since it is desired to have a substantial reservoir of oil and to enlarge the primary chamber 29, the inner sleeve 18 is separated from the outer sleeve 16 to provide an intervening annular volume 31. To close the upper end of the primary chamber, a packing assembly 33 is situated at the upper end of the annular volume 31, being held in place by a snap ring 34.

While the reservoir can be reduced in volume and the inner sleeve can operate directly against the outer sleeve, it is preferred to utilize the separated arrangement shown in FIGURE 1. Because of the spacing there is also provided an upper bearing ring 36 lying against the packing 33 and held in position by a snap ring 37. Thus, the bearing ring 36 is in direct support of the inner sleeve. Similarly, an annular bearing 38 is positioned on the lower end of the lower sleeve between snap rings 39 and 41 so that the outer surface of the bearing 38 slides on the inner wall of the outer sleeve. In this fashion, the inner and outer sleeves are well held with respect to each other for translation and for rotation.

While the lower bearing 38 can be made with a relatively loose fit in order to maintain an appropriate communication between the lower portion of the primary chamber 29 and the remainder thereof constituted by the annular chamber 31, it is preferred to pierce the lower bearing 38 with a number of axially extending holes 42. These are sufficient so that there is little or no restriction interposed by the lower bearing and the bearing is by-passed, the fluid maintaining continuity.

It is desired also to have a certain restrictive or dash-pot effect due to transfer of fluid within the interior of the inner sleeve 18 and the primary chamber 29 as the parts translate. This is accomplished by screwing in an apertured plate 46 at the lower end of the inner sleeve 18, this plate having a wrench hole 47 and more particularly having a central aperture 48 through which the fluid flows to and from the inside of the inner sleeve 18. Conveniently, the apertured plate 46 also serves as a securing nut at is presses against a spacer tube 49 lying within the inner sleeve 18 and abutting a bulkhead 51 resting against a shoulder 52 in the interior of the inner sleeve.

Depending from the bulkhead is a guard tube 53 leading to an orifice 54 extending through the bulkhead and partially made up of a number of passageways disposed around a central boss 56. A poppet valve 57 has a head 58 with a conical seat adapted to rest against the upper terminus of the orifice 54 and likewise has a stem 59 depending through and guided in the boss 56. Adjusting nuts 61 on the stem 59 limit the lifting movement of the poppet valve. A helical spring 62 surrounds the valve stem in a position between the head 58 and the boss 56 and normally urges the poppet valve open so that the orifice is not restricted.

Within the inner sleeve and above the bulkhead 51 and the valve 57 is a secondary chamber 66 defined not only by the bulkhead and the interior walls of the inner sleeve, but also closed by a top cap 67 secured in position by fastening 68 and sealed by a packing 69 so that the secondary chamber is airtight. Wherein reference is made to air, it is intended to include other fluids such as relatively permanent, single gases and the like.

While the secondary chamber 66 can itself serve as an appropriate gas enclosure with most materials, it is preferred to provide within the secondary chamber a barrier 71 in the nature of a flexible, accumulator bladder. This often is made of rubber or rubberized fabric which is quite pliable and conforms generally to the interior configuration of the secondary chamber, although certain portions of the bladder may be stiffened to have a configuration of their own. Access to the interior of the bladder is had through a charging stem 72 provided with a regulating and filling valve 73. Gases such as air and nitrogen can readily be charged through the valve 73 to the interior of the bladder 71. The accumulator can thus be provided with a supply of gas under any selected or regulated pressure. Usually the size of the bladder 71 is such that it closes the poppet valve head 58 as shown in FIGURE 1 unless the pressure below the valve is considerably in excess of the pressure within the bladder.

Between the guard tube 53 and the spacer tube is an annular chamber 75 filled with pressurized gas introduced after the primary chamber is filled with fluid. A flexible tube is inserted through the opening of the plug 28, guided through the aperture 48 and up to the chamber 75. The gas so introduced displaces a corresponding amount of fluid, the gas thereafter being trapped.

In the operation of this structure the supply of oil in the primary chamber extends substantially to the levels shown, under quiescent conditions, and as stated the poppet valve 57 is normally closed by the bladder when a moderate pressure is available in the primary chamber. This pressure is usually that due to the light load on the frame 22.

As long as the vehicle continues to be lightly loaded, the rising and falling movement of the frame 22 with respect to the ground running gear 4 is such that the air body within the upper part of the annular chamber 75 is compressed and expanded correspondingly. The pressure fluctuation of this air and the accompanying oil flow are usually sufficient to take care of all light load undulations.

However, when the truck is loaded and there is a substantial increase in the weight upon the frame 22, then the inner sleeve 18 is depressed farther into the outer sleeve 16. This displaces a large quantity of the oil body 26 through the opening 48 and upwardly, the oil severely compressing the trapped air in the gas chamber 75. Under sufficient compression, the oil pressure within the tube 53 opens the valve 57 against the bladder pressure.

Since the pressure within the bladder is relatively high, the amount of deflection of the bladder for a given light load is zero or relatively small compared to the light load motion of the inner and outer sleeves. Yet, the heavy load is adequately sustained with a yielding motion of the bladder so that the riding of the laden vehicle is proper.

When the load is subsequently reduced, the bladder tends again to expand, thus closing the valve 57 as the inner sleeve rises with respect to the outer sleeve. But the bladder cannot expand indefinitely, being confined in the secondary chamber. Hence, the bladder pressure does not drop to a low value but remains fairly high at all times. Under the reduced load, the air body in the gas chamber 75 effects cushioning, as previously described.

The amount of compressed gas within the accumulator 71, the amount of oil within the primary chamber and the amount of air within the gas chamber 75 can be varied from time to time. The volumetric characteristics of the suspension can thus be changed to accord with the particular condition of the vehicle, whether lightly loaded or heavily loaded, and can also take into account the expected terrain over which the vehicle is to operate. During all of the functioning of the suspension mechanism the sleeves are freely rotatable about the axis 17 with respect to each other. A standard steering mechanism (not shown) is effective to produce such rotation and thus to guide the vehicle.

Figure 2:
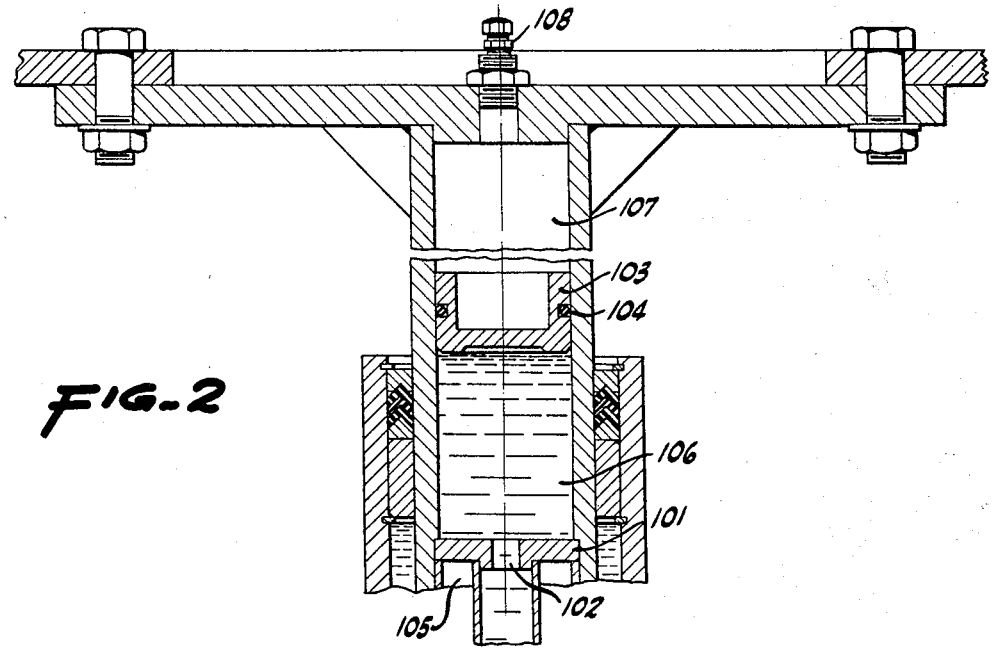
FIGURE 2 is a cross section quite similar to FIGURE 1 but showing a modified form of vehicle suspension pursuant to the invention.

In FIGURE 2 a comparable arrangement is provided. The part of the figure broken away substantially duplicates the corresponding parts of FIGURE 1. In this instance, the bulkhead 101 replaces the bulkhead 51 and the orifice 102 is left unobstructed by any valve. As before, moderately pressurized air is trapped within a gas chamber 105 to take care of light load conditions. The flexible bladder 71 is replaced by a free piston 103 having a packing ring 104 extending therearound. The piston serves to separate the oil body 106 from the gas body 107 in the secondary chamber. A charging valve 108 like the valve 73 is provided. The operation of this structure is substantially the same, under the same conditions of operation, as previously described.

Figure 3:
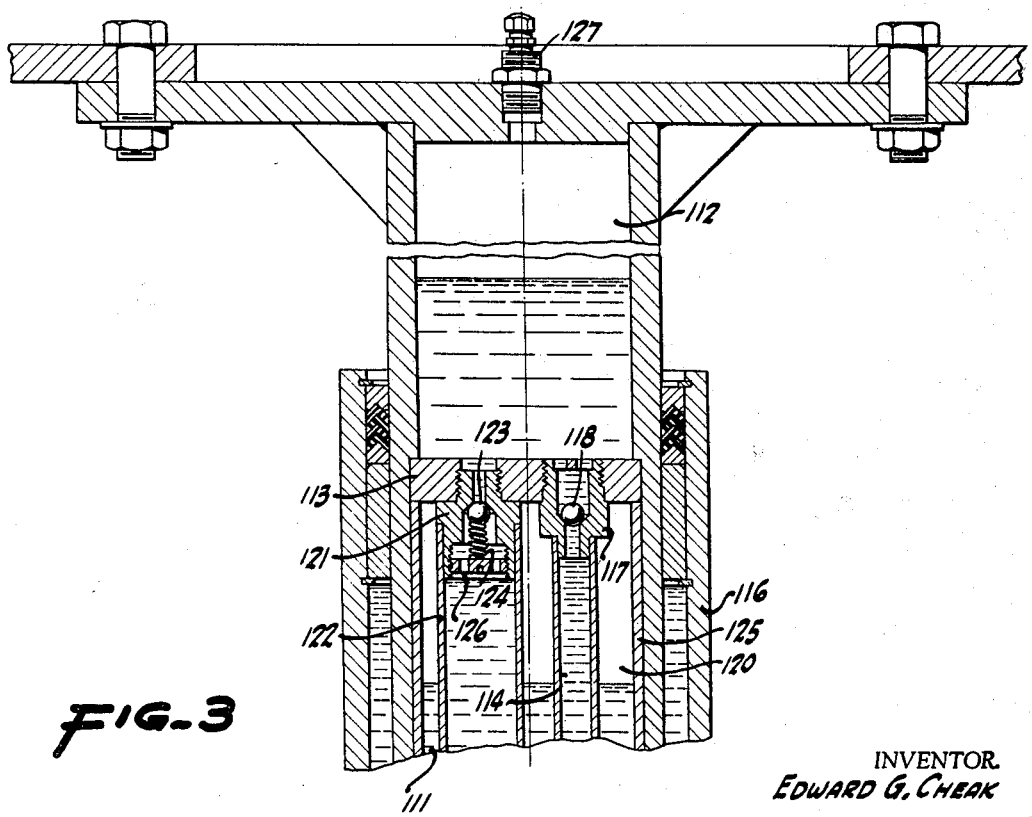
FIGURE 3 is a view comparable to FIGURE 1 but showing a further modified form of vehicle suspension pursuant to the invention.

In FIGURE 3 a related mechanism is disclosed, those portions that are broken away being substantially the same as before. In this instance the primary chamber 111 has a body of oil therein, as before. The chamber 111 is separated from a secondary chamber 112 by an intervening bulkhead 113. Depending from the bulkhead is a charging tube 114 extending well down into the oil body within the outer sleeve 116 and secured in position by a fitting 117 screwed into the bulkhead. The fitting is designed not only to afford a passageway between the tube 114 and the secondary chamber 112, but likewise to serve as a cage for a check valve 118. The valve 118 opens upwardly and permits oil to flow upwardly through the charging tube 114 into the secondary chamber 112 but precludes any return flow from the secondary chamber 112 back to the primary chamber within the outer sleeve 116. To permit backflow under regulated conditions, the bulkhead 113 carries a fitting 121 to which a return tube 122 is secured. Within the fitting 121 is a regulator ball 123 urged toward closed position in an upward direction by a helical spring 124. An adjustable nut 126 permits regulation of the pressure of the spring 124. A trapped gas chamber 120 for light load conditions is defined by the bulkhead 113 and a spacer sleeve 125.

In the operation of this device, when the load is relatively heavy, the inner sleeve is depressed into the outer sleeve and, after due compression of the air within the chamber 120, oil from the primary chamber is driven up the tube 114 past the check valve 118 into the secondary chamber 112. This increases the volume of oil therein and decreases the volume of air or other gas therein. High pressure gas is supplied to the secondary chamber under appropriate pressure through a charging valve 127, as before.

When the load decreases, the oil in the secondary chamber 112 cannot return through the tube 114 because the check valve 118 closes. However, if the gas pressure is sufficient, the ball 123 is displaced against the spring 124 and oil flows out of the secondary chamber around the ball 123 and through the tube 122 back to the primary chamber. When sufficient oil has been discharged to reduce the gas pressure in the secondary chamber to the set value, the ball 123 closes, thus trapping the gas at the set pressure within the secondary chamber. Concurrently, the air within the primary chamber portion 120 resumes its cushioning of the light load. In this fashion the vehicle is provided with a two-stage suspension which can operate equally well under light load and heavy load conditions.

In the variation disclosed in FIGURE 4, the annular volume 31 between the inner and outer sleeves, as shown in FIGURE 1, is augmented by the provision of a low pressure accumulator 131. This accumulator is very much like that disclosed in FIGURE 1, having an appropriate entrance valve and a gas charging valve 132. The volume within the primary chamber 133 can thus be established at the desired amount.

In a comparable fashion, the secondary chamber 136 is augmented by a high pressure accumulator 137 having the customary inlet valve, as shown in FIGURE 1, and likewise having a charging valve 138 like the valve 73. The accumulator 137 acts like the bladder 71 in FIGURE 1. The operation of this structure is about as previously described, there being some simplification in specially made parts. The accumulators 131 and 137 are normally obtainable as commercial items and can thus be readily exchanged or replaced when desired.

As a further variation, the FIGURE 5 arrangement includes not only a primary chamber 151, including both an oil body 150 and a gas body 155, but likewise has a bulkhead 152 separating such chamber from a secondary chamber 153 formed in a separate cap 154 filled with gas under high pressure. The cap 154 is secured by fastenings 156 to a frame plate 157 comparable to the frame plate 19. To separate the primary and secondary chambers, a flexible diaphragm 158 is interposed therebetween to overlie the bulkhead 152. An orifice 159 through the bulkhead is controlled by a valve 161 spring urged toward open position. The valve is illustrated under a condition in which the pressure in the secondary chamber is substantially greater than the pressure within the primary chamber.

In the operation of this structure, oil is supplied to a selected level in the oil body 150 and air under approximately 30 p.s.i. is introduced into the chamber 155. Within the cap 154, air is introduced under a pressure of about 300 p.s.i. Under light load conditions, as the frame plate 157 moves up and down, the pressure in the primary air chamber 155 varies from time to time and more or less rapidly, depending upon the oil volume, but does not greatly exceed the normal pressure. Thus, the diaphragm 158 is not deflected.

On the other hand, when the vehicle is heavily loaded, then the plunger moves into the cylinder sufficiently to raise the pressure in the primary chamber to and above 300 p.s.i.

Under these circumstances, when the pressure on the lower side of the diaphragm 158 exceeds the pressure in the upper, secondary chamber, the valve 161 is raised, thus lifting the diaphragm and bringing the capacity of the upper chamber 153 into play. Finally, if the level of the oil pool 150 is raised sufficiently, the oil is throttled through the orifice 159 in the bulkhead 152. The arrangement, as before, affords an appropriate suspension for the vehicle whether under light load or under heavy load.

It is also to be noted, that in common with the previously described structures, the FIGURE 5 form of the device also provides structure for limiting the maximum expansion of the secondary chamber. In other words, the bulkhead 152, together with the valve head 161, prevent downward movement of the diaphragm 158 beyond that shown in FIGURE 5, thus providing a control on the maximum capacity and pressure of the secondary chamber. This capability, in turn, affords a nice degree of control on the conditions under which the device shifts from light to heavy and heavy to light load situations.

What is claimed is:
1. A vehicle suspension comprising:
   (a) a lower member;
   (b) an upper member;
   (c) means for interconnecting said upper member and said lower member for rotation relative to each other about a substantially vertical axis and for translation relative to each other along said axis including a pair of telescoping circular cylindrical sleeves, the inner one of said sleeves having a bulkhead extending thereacross;
   (d) means for closing the lower end of said interconnecting means to define a primary chamber for containing a body of oil and a body of air located below said bulkhead;
   (e) means for closing the upper end of said interconnecting means to define a secondary chamber for containing at least a body of gas, said bulkhead including at least one orifice interconnecting said primary chamber and said secondary chamber;
   (f) movable means between said primary chamber and said secondary chamber for physically separating said chambers; and
   (g) means for limiting the maximum expansion of said secondary chamber.

2. A vehicle suspension as in claim 1 in which at least a part of the volume of at least one of said chambers is provided by an accumulator.

3. A vehicle suspension as in claim 2 in which said accumulator includes a poppet valve at the entrance thereto, and a spring urging said valve toward open position.

4. A vehicle suspension as in claim 1 wherein said movable means includes a flexible diaphragm covering said orifice, said diaphragm being movable toward and away from said orifice in dependence upon the relative pressures within said chambers.

5. A vehicle suspension as in claim 1 wherein said bulkhead has at least two of said orifices formed therein, and in which first and second tubes depend from said bulkhead into said body of oil in said primary chamber with each of said tubes communicating with a corresponding one of said orifices, said orifices connecting with a body of oil in said secondary chamber, said first tube including a first check valve effective to unseat and direct the flow of oil from said primary chamber into said secondary chamber as the pressure in the former exceeds that in the latter, said second tube including a second check valve effective to unseat and direct the flow of oil from said secondary chamber into said primary chamber as the pressure in the former exceeds that in the latter, and means for selectively controlling the actuation of said second valve to accord with a pre-established pressure within said secondary chamber.

References Cited
UNITED STATES PATENTS

| | | | |
|---|---|---|---|
| 2,436,573 | 2/1948 | Heynes | 267–64 |
| 3,036,844 | 5/1962 | Vogel | 267–64 X |
| 3,088,726 | 5/1963 | Dangauthier | 267–64 |
| 3,168,302 | 2/1965 | Burris | 267–64 |

DUANE A. REGER, *Primary Examiner.*